US012717046B2

(12) United States Patent
Vercier et al.

(10) Patent No.: US 12,717,046 B2
(45) Date of Patent: Aug. 25, 2026

(54) NAVIGATION AND POSITIONING DEVICE

(71) Applicant: THALES, Meudon (FR)

(72) Inventors: Nicolas Jean-Marc Frédéric Vercier, Valence (FR); Vincent Chopard, Valence Cedex (FR); Jacques Coatantiec, Valence (FR); Grégoire Brisson, Valence (FR); Emmanuel Nguyen, Valence (FR)

(73) Assignee: THALES, Meudon (FR)

( * ) Notice: Subject to any disclaimer, the term of this patent is extended or adjusted under 35 U.S.C. 154(b) by 3 days.

(21) Appl. No.: 18/880,549

(22) PCT Filed: Jul. 7, 2023

(86) PCT No.: PCT/EP2023/068891

§ 371 (c)(1),
(2) Date: Dec. 31, 2024

(87) PCT Pub. No.: WO2024/008942

PCT Pub. Date: Jan. 11, 2024

(65) Prior Publication Data

US 2025/0389852 A1 Dec. 25, 2025

(30) Foreign Application Priority Data

Jul. 8, 2022 (FR) ....................................... 2207004

(51) Int. Cl.

*G01S 19/47* (2010.01)
*G01S 19/39* (2010.01)
*G01S 19/40* (2010.01)

(52) U.S. Cl.

CPC ............ *G01S 19/47* (2013.01); *G01S 19/393* (2019.08); *G01S 19/40* (2013.01)

(58) Field of Classification Search

CPC ........ G01S 19/47; G01S 19/393; G01S 19/40; G01S 19/20; G01S 19/45; G01C 21/188; G01C 21/165

See application file for complete search history.

(56) References Cited

U.S. PATENT DOCUMENTS

2012/0022784 A1* 1/2012 Louis .................. G01C 21/005 701/445
2018/0089994 A1* 3/2018 Dhondse ................ G08G 1/056

(Continued)

FOREIGN PATENT DOCUMENTS

EP 3901650 A1 10/2021
FR 3089305 A1 6/2020

OTHER PUBLICATIONS

Zhenzhen, Mai, et al., "Mobile target localization and tracking techniques in harsh environment utilizing adaptive multi-modal data fusion", IET Communications, the Institution of Engineering and Technology, GB, vol. 15, No. 5, Feb. 3, 2021 (Feb. 3, 2021), pp. 736-747.

(Continued)

*Primary Examiner* — Russell Frejd
(74) *Attorney, Agent, or Firm* — Soquel Group LLC

(57) ABSTRACT

A navigation and positioning device including at least an inertial measurement unit, a GNSS measurement receiver, a unit for modeling the displacement(s) of the vehicle, a main Kalman filter calculating navigation data corrections by data hybridization, and at the output of the main Kalman filter at least two distinct Kalman sub-filters including a first Kalman sub-filter calculating navigation data corrections by hybridization of data provided by the inertial measurement unit and by the receiver of GNSS satellite positioning measurements, and a second Kalman sub-filter calculating navigation data corrections by hybridization of data provided by the inertial (Continued)

measurement unit and by the unit for modeling displacement(s) of the vehicle.

10 Claims, 4 Drawing Sheets

(56) References Cited

U.S. PATENT DOCUMENTS

| | | | | |
|---|---|---|---|---|
| 2024/0337762 | A1* | 10/2024 | Morgan | G01S 19/215 |
| 2025/0067878 | A1* | 2/2025 | Becheret | G01S 19/393 |
| 2025/0389853 | A1* | 12/2025 | Nguyen | G01S 19/20 |

OTHER PUBLICATIONS

FR 2207004, INPI Rapport de Recherche Preliminaire, Feb. 21, 2023, 2 pages.

PCT /EP2023/068891, International Search Report, Sep. 25, 2023, 2 pages.

* cited by examiner

D
50
K
12
14
16
18
$SF_1$
$SF_2$
$SF_3$
20
22
24
26
28
30
32
34
36
38
40
42
44
46
48
+
+

NAVIGATION AND POSITIONING DEVICE

CROSS-REFERENCE TO RELATED APPLICATIONS

This application claims benefit under 35 USC § 371 of PCT Application No. PCT/EP2023/068891 entitled NAVIGATION AND POSITIONING DEVICE, filed on Jul. 7, 2023 by inventors Nicolas Jean-Marc Frédéric Vercier, Vincent Chopard, Jacques Coatantiec, Grégoire Brisson and Emmanuel Nguyen. PCT Application No. PCT/EP2023/068891 claims priority of French Patent Application No. 22 07004, filed on Jul. 8, 2022.

FIELD OF THE INVENTION

The present invention relates to a navigation and positioning device suitable for being carried on-board a vehicle suitable for moving between two geographical positions, the device comprising at least: an inertial measurement unit suitable for providing navigation measurements, a receiver for positioning measurements by GNSS satellite(s), a unit for modeling displacement(s) of said vehicle, a closed-loop main Kalman filter configured to calculate corrections of navigation data by hybridization of data provided, at the input of said main Kalman filter, at the same time, by: said inertial measurement unit, said receiver of positioning measurements by GNSS satellite(s), and said unit for modeling displacement(s) of said vehicle.

The invention further relates to a vehicle comprising such a navigation and positioning device.

The present invention relates to the navigation of a vehicle (also called a carrier) apt to move between two geographical positions, such as a land vehicle corresponding in particular to a car, a truck, a military or civil armored vehicle, an aircraft using e.g. an OANS (Onboard Airport Navigation System).

BACKGROUND OF THE INVENTION

The navigation of such vehicles, in particular rolling land vehicles (car, truck, tanks, etc.) is generally implemented using a GNSS (Global Navigation Satellite System).

To this end, the vehicle generally carries a satellite navigation and positioning system receiver configured to determine, in particular by trilateration, a positioning (i.e. a geolocation position or a geolocation solution) of the aircraft using estimates of distances to visible satellites of the same or of a plurality of constellations of satellites of the satellite navigation and positioning system. Examples of satellite navigation systems are the American GPS system, the European GALILEO system, the Russian GLONASS system, the Chinese BEIDOU system, etc.

As an alternative, other navigation and positioning systems are based on hybridization of an inertial measurement unit and of modeling of the displacement of the vehicle using data provided by an odometer or by a tachometer.

Such navigation and positioning systems have an accuracy on the same order of magnitude as GNSS location, more particularly over times on the order of a few hours. On the other hand, such navigation and positioning systems require an initial position.

Moreover, as described in patent FR 3 089 305 B1 for an aircraft on the ground, there are other navigation and positioning systems apt to combine the two aforementioned types of navigation and positioning systems and based on a so-called "loose" hybridization (or geographical axis hybridization in) using in particular the GNSS position (e.g. GPS) to readjust the inertial unit. Such hybridization is hereinafter called INS/VEH/GNSS, where INS (Inertial Navigation System) represents the contribution to hybridization of the inertial measurement unit, VEH for "vehicle" to represent the contribution to hybridization of a unit for modeling displacement(s) of the vehicle, said modeling unit being suitable for determining the transverse and vertical readjustment of the vehicle, as well as the longitudinal readjustment of the vehicle via an odometer or a tachometer, and a GNSS as aforementioned.

However, the INS/VEH/GNSS hybridization implemented according to current techniques is not optimal to protect against:

- GNSS errors in the event of satellite failure, GNSS software or hardware fault, multi-path, or intentional or unintentional interference,
- VEH errors provided by the unit for modeling displacement(s) of the vehicle, in particular in the event of unmodeled behaviors of the vehicle such as excessive skidding, or else sliding, or else due to a defective odometer or tachometer, or in the presence of vehicle wheel-spin, nor for providing integrated positioning when such GNSS and/or VEH errors occur.

SUMMARY OF THE DESCRIPTION

The aim of the invention is then to propose a navigation and positioning device which at least makes it possible to maintain the integrity of the positioning independently of the vulnerability of the GNSS and/or VEH measurements.

To this end, the invention provides a navigation and positioning device suitable for being carried on-board a vehicle suitable for moving between two geographical positions, the device comprising at least:

- an inertial measurement unit suitable for providing navigational measurements,
- a receiver of GNSS positioning measurements,
- a unit for modeling the displacement(s) of said vehicle,
- a closed-loop main Kalman filter configured to compute navigation data corrections by hybridization of data provided, at the input of said main Kalman filter, at the same time, by:
- said inertial measurement unit,
- said receiver of GNSS positioning measurements, and
- said unit for modeling the displacement(s) of said vehicle, the device further comprising at the output of said main Kalman filter, at least two distinct Kalman sub-filters comprising:

- a first Kalman sub-filter configured to calculate navigation data corrections by hybridization of data provided by the inertial measurement unit and by a GNSS positioning measurements receiver,
- a second Kalman sub-filter configured to calculate navigation data corrections by hybridization of data provided by the inertial measurement unit and by said unit for modeling displacement(s) of said vehicle, each Kalman sub-filter being suitable for:

- applying the hybrid correction provided, at the input, at each cycle, by the main Kalman filter during the propagation phase thereof, and
- determining a positioning of said vehicle associated with said Kalman sub-filter considered by applying the correction calculated by said Kalman sub-filter to the hybrid positioning obtained from said main Kalman filter.

Thereby, the navigation and positioning device according to the present invention has a particular architecture for consolidating the different information in an INS/VEH/GNSS location, with loose or tight GNSS hybridization (when the receiver of GNSS positioning measurements provides the information extracted upstream by the GNSS receiver, namely pseudo-distances and pseudo-speeds (quantities directly derived from the measurement of the propagation time and the Doppler effect of the signals transmitted by the satellites toward the receiver), in order to maintain almost permanently, or even permanently, the integrity of the associated location.

To this end, said particular architecture provides a main position INS/VEH/GNSS via the main Kalman filter, and additional positions INS/GNSS and INS/VEH which contain only INS and GNSS information (without VEH) and INS and VEH information (without GNSS), respectively. Such additional positions INS/GNSS and INS/VEH are derived from the first, second and third Kalman sub-filters at the deviations from the main Kalman filter (INS/VEH/GNSS).

According to other advantageous aspects of the invention, the navigation and positioning device comprises one or a plurality of the following features, taken individually or according to all technically possible combinations:

- the device further comprises an integrity verification module configured:
  - to check, at each cycle, the integrity of said data provided by said unit for modeling displacement(s) of said vehicle, and/or the integrity of said data provided by said receiver of GNSS positioning measurements, by comparing, with a predetermined threshold, the difference between the state of each Kalman sub-filter and the state of the main Kalman filter,
  - in the event of a deviation greater than said predetermined threshold, to raise an alarm suitable for signaling a vulnerability of said data provided by said unit for modeling the displacement(s) of said vehicle, and/or a vulnerability of said data provided by said receiver of GNSS positioning measurements;
- the device is configured for comparing:
  - with a predetermined threshold for latitude, the deviation between the latitude position state of each Kalman sub-filter and the latitude position state of the main Kalman filter,
  - with a predetermined threshold for longitude, the deviation between the longitude position state of each Kalman sub-filter and the longitude position state of the main Kalman filter,
  - with a predetermined threshold for altitude, the deviation between the altitude position state of each Kalman sub-filter and the altitude position state of the main Kalman filter, and to raise an alarm as soon as at least one deviation associated with one of the latitude, longitude, altitude components is greater than the corresponding predetermined threshold and associated with each of the latitude, longitude, altitude components, respectively;

- the device is also configured to determine said predetermined threshold based on a predetermined probability of false alarm;
- the device further comprises, at the output of said Kalman filter, a third Kalman sub-filter configured to calculate navigation data corrections from the data provided solely by the inertial measurement unit, and in the event of alarm raising, the main Kalman filter, the first Kalman sub-filter and the second Kalman sub-filter are also suitable for being reconfigured on the third Kalman sub-filter configured to calculate navigation data corrections from the data provided only by the inertial measurement unit;
- the main Kalman filter, the first Kalman sub-filter and the second Kalman sub-filter are each reconfigured by replacing their own state and their own covariance matrix with the state and the covariance matrix of the third Kalman sub-filter, respectively;
- the device is also configured to determine a radius of protection with respect to a vulnerability of said data provided by said unit for modeling displacement(s) of said vehicle, and/or a vulnerability of said data provided by said receiver of GNSS positioning measurements, said radius of protection guaranteeing that the value of the distance between the hybrid position provided from said main Kalman filter and the true position of said vehicle is less than the value of said radius of protection, said radius of protection being determined by determining a radius of protection associated with each of the first and second Kalman sub-filters, using, for each of the first, and second Kalman sub-filters:
  - a coefficient associated with a predetermined probability of false alarm,
  - the covariance matrix of the difference between the state of said Kalman sub-filter considered and the state of the main Kalman filter,
  - a coefficient associated with a predetermined probability of non-detection
  - the covariance matrix of each Kalman sub-filter,
- said radius of protection being the largest of the radii of protection associated with each of the first and second Kalman sub-filters.
- the device is also configured to determine a radius of uncertainty, said radius of uncertainty being determined by determining a radius of uncertainty associated with each of the first and second Kalman sub-filters, using, for each of the first and second Kalman sub-filters:
  - the difference between the state of said Kalman sub-filter considered and the state of the main Kalman filter,
  - a coefficient associated with a predetermined probability of non-detection
  - the covariance matrix of each Kalman sub-filter, said radius of uncertainty being the largest of the radii of uncertainty associated with each of the first and second Kalman sub-filters.

- the device further comprises a module for initializing the position of said vehicle configured to initialize the position of said vehicle using at least one of the elements belonging to the group comprising at least:
  - a positioning measurement provided by a GNSS source,
  - a consolidated positioning measurement from a plurality of distinct GNSS sources,
  - a position entered manually via an input interface of said device,
  - a stored position prior to the preceding switch-off of said device,
  - a positioning measurement provided by a GNSS source consolidated by a position stored prior to the preceding switching off of said device,
  - a position entered manually via an input interface of said device consolidated by a position stored prior to the preceding switching off of said device.

A further subject matter of the invention is a vehicle comprising such a navigation and positioning device.

A further subject matter of the invention is a navigation and positioning method implemented by said navigation and positioning device according to the present invention as described hereinabove, and comprising the following steps implemented at each cycle of the main Kalman filter and of each Kalman sub-filter:

locating said vehicle using the corrections provided by the main Kalman filter and by each Kalman sub-filter, respectively, checking, at each cycle, the integrity of said data provided by said unit for modeling displacement(s) of said vehicle, and/or the integrity of said data provided by said receiver of GNSS positioning measurements, by comparing, with a predetermined threshold, the difference between the state of each Kalman sub-filter and the state of the main Kalman filter, in the event of a deviation greater than said predetermined threshold:

raising of an alarm suitable for signaling a vulnerability of said data provided by said unit for modeling the displacement(s) of said vehicle, and/or a vulnerability of said data provided by said receiver of GNSS positioning measurements reconfiguration of the first Kalman sub-filter and of the second Kalman sub-filter to a third Kalman sub-filter configured to calculate navigation data corrections from data provided only by the inertial measurement unit;

in the absence of a deviation greater than said predetermined threshold:

determination of a radius of protection with respect to a vulnerability of said data provided by said unit for modeling displacement(s) of said vehicle, and/or a vulnerability of said data provided by said receiver of GNSS positioning measurements, said radius of protection guaranteeing that the value of the distance between the hybrid position provided from said main Kalman filter and the true position of said vehicle is less than the value of said radius of protection, said radius of protection being determined by determining a radius of protection associated with each of the first and second Kalman sub-filters, using, for each of the first and second Kalman sub-filters:

a coefficient associated with a predetermined probability of false alarm, the covariance matrix of the difference between the state of said Kalman sub-filter considered and the state of the main Kalman filter, a coefficient associated with a predetermined probability of non-detection the covariance matrix of each Kalman sub-filter, said radius of protection being the largest of the radii of protection associated with each of the first and second Kalman sub-filters.

determination of a radius of uncertainty, said radius of uncertainty being determined by determining a radius of uncertainty associated with each of the first and second Kalman sub-filters, using, for each of the first and second Kalman sub-filters:

the difference between the state of said Kalman sub-filter considered and the state of the main Kalman filter, a coefficient associated with a predetermined probability of non-detection;

the covariance matrix of each Kalman sub-filter;

said radius of uncertainty being the largest of the radii of uncertainty associated with each of the first and second Kalman sub-filters.

According to a particular aspect of said method, said check consists in comparing:

with a predetermined threshold for latitude, the deviation between the latitude position state of each Kalman sub-filter and the latitude position state of the main Kalman filter, with a predetermined threshold for longitude, the deviation between the longitude position state of each Kalman sub-filter and the longitude position state of the main Kalman filter, with a predetermined threshold for altitude, the deviation between the altitude position state of each Kalman sub-filter and the altitude position state of the main Kalman filter, and to raise an alarm as soon as at least one deviation associated with one of the latitude, longitude, altitude components is greater than the corresponding predetermined threshold and associated with each of the latitude, longitude, altitude components, respectively.

According to another particular aspect of said method, the method further comprises the determination of said predetermined threshold as a function of a predetermined probability of false alarm.

According to another particular aspect of said method, the method further comprises a step of initialization of the position of said vehicle by using at least one of the elements belonging to the group comprising at least:

a positioning measurement provided by a GNSS source, a consolidated positioning measurement from a plurality of distinct GNSS sources, a position entered manually via an input interface of said device, a stored position prior to the preceding switch-off of said device, a positioning measurement provided by a GNSS source consolidated by a position stored prior to the preceding switching off of said device, a position entered manually via an input interface of said device consolidated by a position stored prior to the preceding switching off of said device.

A further subject matter of the invention is a computer program including software instructions which, when executed by a computer, implement such a satellite navigation and positioning method as defined hereinabove.

BRIEF DESCRIPTION OF THE DRAWINGS

Such features and advantages of the invention will become clearer upon reading the following description, given only as a non-limiting example, and made with reference to the enclosed drawings, wherein.

DETAILED DESCRIPTION OF EMBODIMENTS

Figure 1:
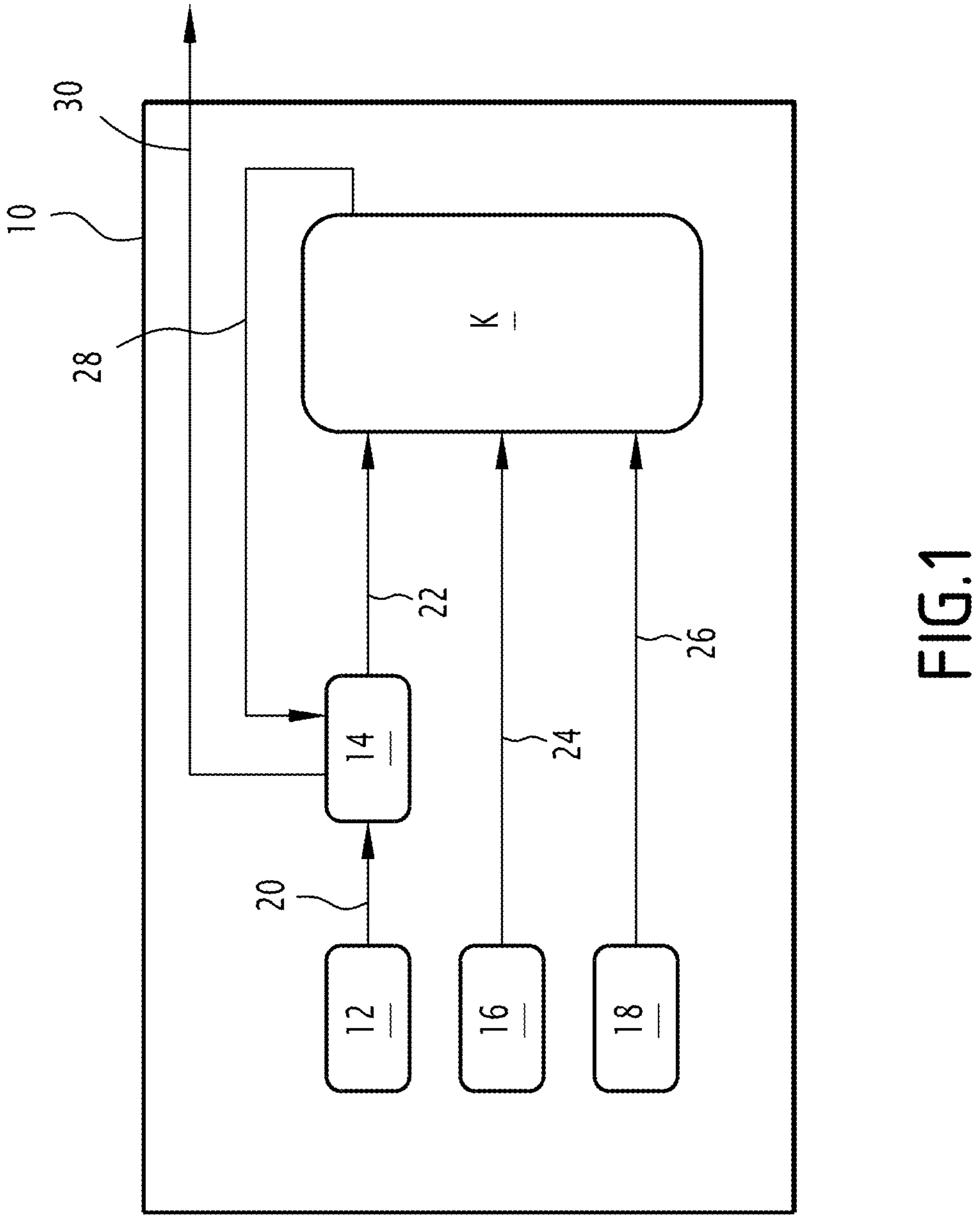
FIG. 1 is a diagram illustrating a navigation and positioning device suitable for implementing an INS/VEH/GNSS hybridization.

FIG. 1 is an overall representation of a navigation and positioning device 10 according to the present invention, suitable for implementing an INS/VEH/GNSS hybridization, and comprising at least one inertial measurement unit 12 suitable for providing navigation measurements, in particular to a virtual platform 14 for calculating and locating, a receiver 16 of GNSS positioning measurements, a unit 18 for modeling displacement(s) of said vehicle, and a Kalman filter K, hereinafter called the main filter.

The inertial measurement unit 12 consists of a set of inertial sensors such as rate gyros and accelerometers associated with processing electronics and is suitable for providing increments 20 of angular rotation and speed of the vehicle wherein the navigation and positioning device 10 is installed.

The virtual computing platform 14 integrates such angular rotation and speed increments 20 to provide, as the main Kalman filter K input, navigation data 22, such as the orientation of the vehicle (i.e. the attitude thereof), in terms of roll, pitch, yaw, heading, etc., the speed of the vehicle, e.g. the speed Vnorth along the Northern direction, the speed Veast along the Eastern direction, the speed Vbottom at the bottom of the trajectory, etc., and the position of the vehicle, e.g. in latitude, longitude, altitude.

The receiver 16 of GNSS positioning measurements is suitable for providing, along the direction of the arrow 24, information on the position and speed of the vehicle by triangulation from signals transmitted by moving satellites visible from the vehicle. The information provided may be temporarily unavailable because, in order to be able to take a bearing, the receiver has to have direct view on a minimum of four satellites of the positioning system. Furthermore, the information has variable accuracy, depending on the geometry of the constellation at the base of the triangulation, and noisy because same relies on the reception of very low level signals coming from distant satellites having a low transmission power. However, the information is not affected by long-term drift, the positions of satellites passing through the orbits thereof being known precisely over the long term. Noise and errors may be related to satellite systems, to the receiver, or to the propagation of the signal between the satellite transmitter and the receiver of GNSS signals. Furthermore, satellite data may be erroneous due to satellite failures. Such affected data must then be identified so as not to distort the position coming from the GNSS receiver.

The unit 18 for modeling displacement(s) of said vehicle is configured to provide measurements of:

- longitudinal displacement of the vehicle from data provided by an odometer or tachometer,
- transverse displacement, assumed to be zero for a land vehicle (i.e. moving on the ground),
- vertical displacement of the vehicle, also assumed to be zero for a land vehicle.

The hybridization implemented by the main Kalman filter K consists in mathematically combining the measurements 22, 24, 26 provided respectively by the inertial measurement unit 12, the receiver 16 of GNSS positioning measurements, and the unit 18 for modeling the displacement(s) of said vehicle in order to obtain position and speed information by taking advantage of the three elements 12 INS, 16 GNSS and 18 VEH.

Kalman filtering is based on the possibilities of modeling the evolution of the state of a physical system considered in the environment thereof, by means of a so-called "evolution" equation (a priori estimation), and of modeling the relation of dependence existing between the states of the physical system considered and the measurements of an external sensor, by means of a so-called "observation" equation for a readjustment of the states of the filter (a posteriori estimation). In a Kalman filter, the effective measurement or "measurement vector" makes it possible to produce an a posteriori estimate of the state of the system which is optimal in the sense that the estimate minimizes the covariance of the error made on the estimate. The estimator part of the filter generates a posteriori estimates of the state vector of the system by using the difference found between the effective measurement vector and the a priori prediction thereof, to generate a corrective term, called innovation. The innovation, after a multiplication by a gain vector of the Kalman filter, is applied to the a priori estimate of the state vector of the system and leads to the obtaining of the a posteriori optimum estimate.

The Kalman filtering implemented by the main Kalman filter K models in particular the evolution of the errors of the inertial measurement unit 12 and delivers the a posteriori estimate of the errors which is used to correct the positioning and speed point of the inertial measurement unit 12.

The INS/VEH/GNSS correction 28 of the errors by means of the estimation thereof made by the main Kalman filter K is then carried out at the input of the virtual platform 14 according to a so-called "closed loop" architecture as illustrated by FIG. 1 making it possible to keep low navigation errors and thus to remain in the linear domain [of] the main Kalman filter K. The virtual platform 14 uses such a correction INS/VEH/GNSS 28 to elaborate the optimum estimate 30 of the position and of the speed of the vehicle.

The hybridization is called "loose" (or geographic axis hybridization) when the receiver 16 of GNSS positioning measurements provides the position and the speed of the vehicle resolved by the GNSS receiver.

Hybridization is called "tight" when the receiver 16 of GNSS positioning measurements supplies the information extracted upstream by the GNSS receiver, namely pseudo-distances and pseudo-speeds (quantities directly derived from the measurement of the propagation time and from the Doppler effect of the signals transmitted by the satellites toward the receiver).

With such a navigation and positioning device 10 by closed loop INS/VEH/GNSS hybridization where the point solved by the GNSS receiver 16 and the unit 18 for modeling the displacement(s) of said vehicle is used to readjust the information coming from the inertial measurement unit 12, it is necessary to monitor the defects affecting the information provided by the satellites because the receiver 16 which receives same will propagate the defects to the inertial measurement unit 12, leading to a wrong readjustment of the latter, and the same would happen for the unit 18 for modeling displacement(s) of said vehicle the defects of which can be also propagated to the inertial measurement unit 12.

Figure 2:
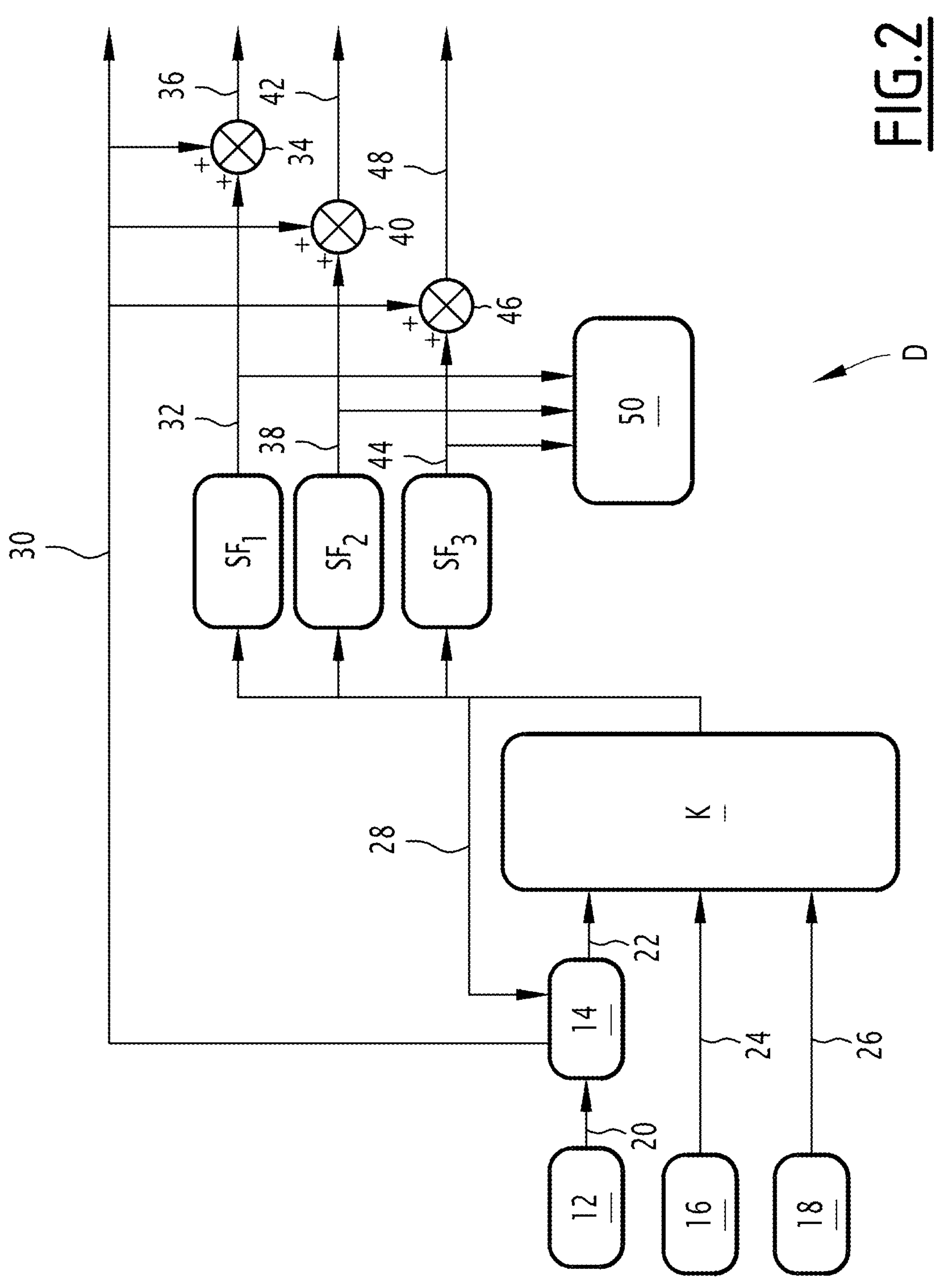
FIG. 2 is a diagram illustrating the architecture of the navigation and positioning device according to the present invention.

To this end, the navigation and positioning device 10 by INS/VEH/GNSS hybridization is completed as illustrated in FIG. 2 to obtain the device D according to the present invention, such a device D having a particular architecture described hereinafter.

The device D indeed comprises, according to the present invention, at least two distinct Kalman sub-filters $SF_1$ and $SF_2$.

The first Kalman sub-filter $SF_1$ is configured to calculate INS/GNSS corrections 32 of navigation data by hybridization of data provided by the inertial measurement unit 12 and by said receiver 16 of GNSS positioning measurements. The first Kalman sub-filter $SF_1$ is suitable for applying the INS/VEH/GNSS hybrid correction 28 provided by the main Kalman filter K at input, at each cycle, during its own propagation phase, and to determine, in particular via the combination element 34, an INS/GNSS positioning 36 of said vehicle associated with said first Kalman sub-filter $SF_1$ considered by applying the INS/GNSS correction 32 calculated by said Kalman sub-filter $SF_1$ to the hybrid positioning 30 INS/VEH/GNSS obtained from said main Kalman filter K.

Similarly, the device D comprises the second Kalman sub-filter $SF_2$ configured to calculate INS/VEH corrections 38 of navigation data by hybridization of data provided by the inertial measurement unit 12 and by said displacement modeling unit 18 of said vehicle. The second Kalman sub-filter $SF_2$ is suitable for applying the INS/VEH/GNSS hybrid correction 28 provided by the main Kalman filter K at the input, at each cycle, during its own propagation phase, and to determine, in particular via the combination element 40, a INS/VEH positioning 42 of said vehicle associated with said second Kalman sub-filter $SF_2$ considered by applying the INS/VEH correction 38 calculated by said second Kalman sub-filter $SF_2$ to the hybrid INS/VEH/GNSS positioning 30 obtained from said main Kalman filter K.

As shown in FIG. 2, the device D optionally further comprises a third Kalman sub-filter $SF_3$ configured to calculate INS corrections 44 of navigation data from the data provided only by the inertial measurement unit. The third Kalman sub-filter $SF_3$ is suitable for applying the hybrid INS/VEH/GNSS correction 28 provided by the main Kalman filter K at the input, at each cycle, during its own propagation phase, and to determine, in particular via the combination element 46, an INS positioning 48 of said vehicle associated with said third Kalman sub-filter $SF_3$ considered by applying the INS correction 44 calculated by said third Kalman sub-filter $SF_3$ to the hybrid INS/VEH/GNSS positioning 30 obtained from said main Kalman filter K.

In other words, according to the architecture shown in FIG. 2, each Kalman sub-filter $SF_1$, $SF_2$ and $SF_3$ is specific to:

- applying the hybrid correction provided, at the input, at each cycle, by the main Kalman filter during the propagation phase thereof, and
- determining a positioning of said vehicle associated with said Kalman sub-filter considered by applying the correction calculated by said Kalman sub-filter to the hybrid positioning 30 obtained from said main Kalman filter.

Thereby, the present invention proposes to determine the hybrid positions 36, 42, INS/VEH, INS/GNSS, respectively, and optionally the inertial position INS from the hybrid INS/VEH/GNSS position 30 and corrections coming from the first and second Kalman sub-filters $SF_1$: INS/VEH, $SF_2$: INS/GNSS, and optionally the third INS sub-filter.

According to the example shown in FIG. 2, the navigation and positioning device D according to the present invention further comprises an integrity verification module 50 configured to:

- check, at each cycle, the integrity of said data provided by said unit 18 for modeling displacement(s) of said vehicle, and/or the integrity of said data provided by said receiver 16 of GNSS positioning measurements, by comparing, with a predetermined threshold, the difference between the state of each Kalman sub-filter $SF_1$, $SF_2$ (and optionally $SF_3$) and the state of the main Kalman filter,
- in the event of a deviation greater than said predetermined threshold, raising an alarm suitable for signaling a vulnerability of said data provided by said unit 18 for modeling displacement(s) of said vehicle, and/or a vulnerability of said data provided by said receiver 16 of GNSS positioning measurements.

As an alternative to the automatic implementation (i.e. without human intervention), via said integrity verification module 50, of said comparison, the comparison, and, where appropriate, raising of an alarm, could be implemented by a device (not shown) distinct from said device D, or by a user at the cost of the associated mental processing time.

According to a variant (not shown), the navigation and positioning device D according to the present invention illustrated by FIG. 2 further comprises a processing unit formed e.g. of a memory and of a processor associated with the memory, and the device D is at least partly implemented in the form of software, or of a software brick, executable by the processor, in particular the Kalman assembly comprising the main Kalman filter K and the Kalman sub-filters $SF_1$, $SF_2$ (and optionally $SF_3$), the virtual platform 14 for calculation and for localization, the integrity and the combination elements 34, 40, and optionally the integrity verification module 50. The memory of the navigation and positioning device D is then apt to store such software or software bricks, and the processor is then apt to execute same.

In a variant (not shown), the Kalman assembly comprising the main filter K, and the Kalman sub-filters $SF_1$, $SF_2$ (and optionally $SF_3$), the virtual platform 14 for calculation and localization, the combination elements 34, 40 and optionally the integrity verification module 50 are each produced in the form of a programmable logic component, such as an FPGA (Field Programmable Gate Array), or else in the form of a dedicated integrated circuit, such as an ASIC (Application Specific Integrated Circuit).

When at least a part of the navigation and positioning device D according to the invention is produced in the form of one or a plurality of software programs, i.e. in the form of a computer program, such part is further apt to be stored on a computer-readable medium (not shown). The computer-readable medium is e.g. a medium apt to store the electronic instructions and to be coupled to a bus of a computer system. As an example, the readable medium is an optical disk, a magneto-optical disk, a ROM memory, a RAM memory, any type of non-volatile memory (e.g. EPROM, EEPROM, FLASH, NVRAM), a magnetic card or further an optical card. A computer program containing software instructions is then stored on the readable medium.

Figure 3:
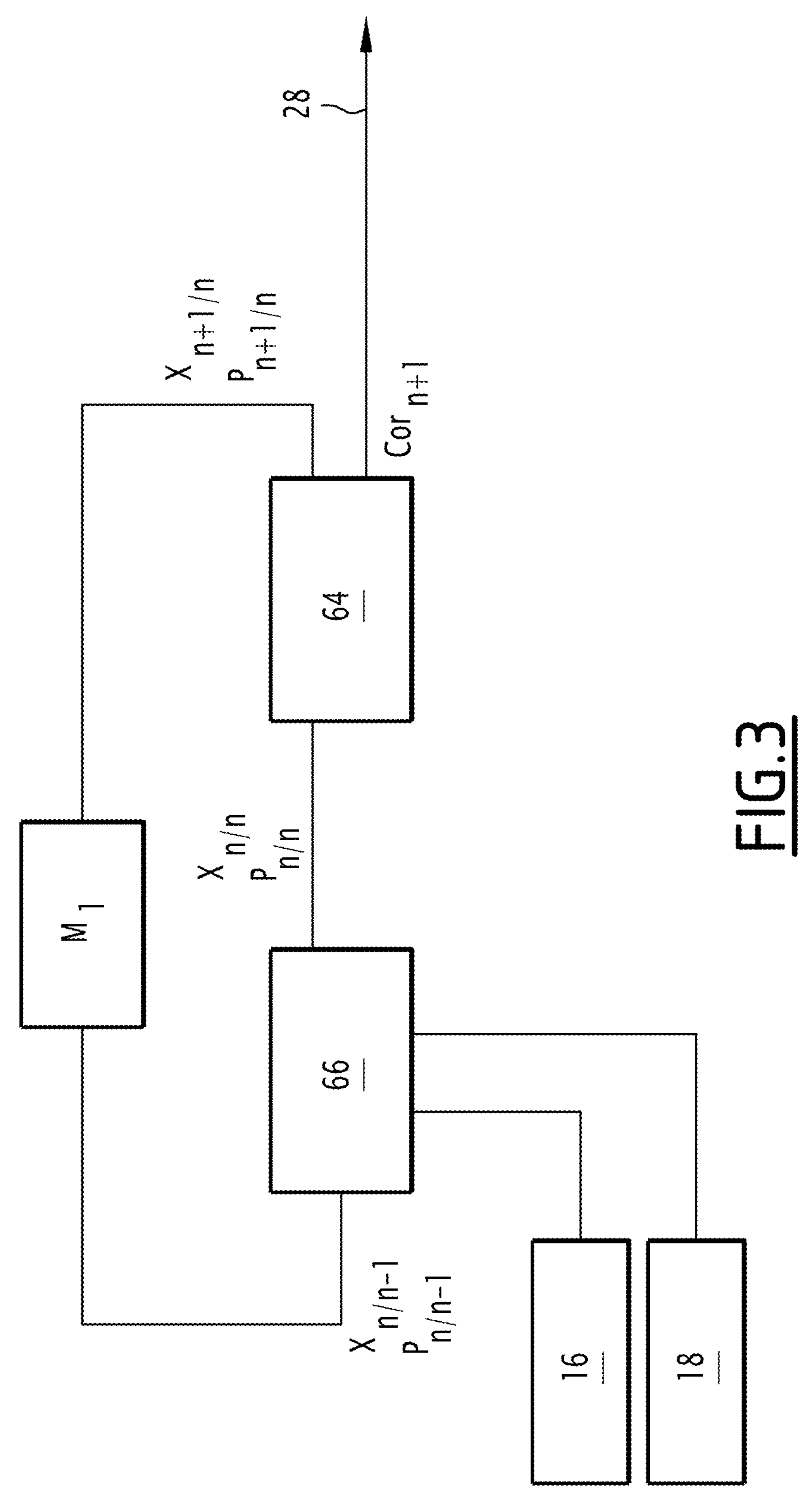
FIG. 3 illustrates the closed loop principle implemented by the main Kalman filter.

FIG. 3 illustrates the closed loop principle applied to the main Kalman filter K, with the X state of the main Kalman filter K, and P the covariance matrix thereof. A propagation module 64 of the main Kalman filter K is configured to propagate the state with using the navigation equations, and a readjustment module 66 is used to estimate the state with the aid of the GNSS measurements provided by said receiver 16 of GNSS positioning measurements and the measurements of the unit 18 for modeling the displacement(s) of said vehicle. The propagation and closed loop readjustment equations are for the readjustment implemented by the module 66:

$$K_n = P_{n/n-1} \cdot H^T (R_n + H \cdot P_{n/n-1} \cdot H^T)^{-1}$$

$$X_{n/n} = X_{n/n-1} + K_n \cdot (Z_n - H \cdot X_{n/n-1})$$

$$P_{n/n} = (I - K_n \cdot H) P_{n/n-1}$$

and for the propagation implemented by the module 64:

$$P_{n+1/n} = F_{n+1} \cdot P_{n/n} \cdot F_{n+1}^T + Q_{n+1}$$

$$X_{n+1/n} = F_{n+1} \cdot X_{n/n} - Cor_n$$

$$Cor_{n+1} = X_{n+1/n}$$

with F the propagation matrix, Q the model noise matrix, R the measurement noise covariance matrix, H the observation matrix, K the Kalman gain and Z the observation vector obtained the receiver 16 and from from the unit 18, $X_{n+1/n}$ the state vector propagated after propagation between the two successive time instants n and n+1. The covariance matrix $P_{n+1/n}$ and the state vector $X_{n+1/n}$ are stored in the memory $M_1$, for a subsequent iteration at the instant n+1.

For each sub-filter, denoted by SF, shown in FIG. 2 among the sub-filters $SF_1$, $SF_2$ and $SF_3$, the conventional equations of the Kalman filtering are used by applying $Cor_{n+1}$, the INS/VEH/GNSS correction 28 of the main filter K at the moment of the propagation.

Readjustment:

$$K^{SF} = P_{n/n-1}^{SF} \cdot H^{SF^T} \left(R + H^{SF} \cdot P_{n/n-1}^{SF} \cdot H^{SF^T}\right)^{-1}$$

$$X_{n+1/n+1}^{SF} = X_{n+1/n}^{SF} + K^{SF} \cdot \left(Z^{SF} - H^{SF} \cdot X_{n+1/n}^{SF}\right)$$

$$P_{n/n}^{SF} = \left(I - K^{SF} \cdot H^{SF}\right) P_{n/n-1}^{SF}$$

Propagation:

$$P_{n+1/n}^{SF} = F \cdot P_{n/n}^{SF} \cdot F^T + Q$$

$$X_{n+1/n}^{SF} = F \cdot X_{n/n}^{SF} - Cor_n$$

With $Cor_n$ the correction coming from the main filter K, $Z^{SF}$ the observation vector which is a subset of Z of the main Kalman filter K. $Z^{SF}$ only contains the observations linked to the GNSS sub-filter SF, obtained from the receiver 16 of GNSS satellite positioning measurements for the first sub-filter $SF_1$ INS/GNSS, VEH obtained from the unit 18 for modeling the displacement of the vehicle for the second sub-filter $SF_2$, INS/VEH and optionally no observations (i.e. neither VEH nor GNSS) for the optional third sub-filter $SF_3$ INS. Moreover, $H^{SF}$ is the observation matrix which contains the H lines of the main Kalman filter K linked to the observations of the sub-filter SF considered among the aforementioned sub-filters $SF_1$, $SF_2$ and optionally $SF_3$, $K^{SF}$ is the gain of the sub-filter SF considered among the aforementioned sub-filters $SF_1$, $SF_2$ and optionally $SF_3$, and $P^{SF}$ is the covariance matrix of the sub-filter SF considered among the aforementioned sub-filters $SF_1$, $SF_2$ and optionally $SF_3$.

In FIG. 2, the position 36 of the INS/GNSS sub-solution associated with the first sub-filter $SF_1$ contains only information from the inertial measurement unit 12 (IMU) and the receiver 16 of GNSS satellite positioning measurements. Same is thus not corrupted by an erroneous VEH measurement from the unit 18 for modeling displacement(s) of the vehicle.

Similarly, the position 42 of the INS/VEH sub-solution associated with the second sub-filter $SF_2$ contains only information from the inertial measurement unit 12 (IMU) and from the VEH unit 18 for modeling displacement(s) of the vehicle. Same is thus not corrupted by an erroneous GNSS measurement provided by the receiver 16 of GNSS positioning measurements.

Optionally, the position 48 of the INS sub-solution associated with the optional third sub-filter $SF_3$ contains only information from the inertial measurement unit 12 (IMU). Same is thus not corrupted by an erroneous GNSS measurement provided by the receiver 16 of GNSS positioning measurements or by an erroneous measurement VEH of the unit 18 for modeling displacement(s) of the vehicle VEH.

More precisely, at each cycle of the main Kalman filter K, the correction of each sub-filter $Cor^{SF}$ is applied to the main position 30 (i.e. associated with the main solution INS/VEH/GNSS) to obtain the position associated with the sub-filter SF considered among the Kalman sub-filters $SF_1$, $SF_2$ (and optionally $SF_3$) according to the following equation:

$$Cor_{n+1}^{SF} = X_{n+1/n}^{SF} - Cor_{n+1} = X_{n+1/n}^{SF} - X_{n+1/n}$$

which is equivalent to:

$$Lat^{SF} = Lat^{INS/VEH/GNSS} + Cor^{SF}(Lat)$$

$$Lon^{SF} = Lon^{INS/VEH/GNSS} + Cor^{SF}(Lon)$$

$$Alt^{SF} = Alt^{INS/VEH/GNSS} + Cor^{SF}(Alt)$$

with Lat, latitude; Lon, longitude; Alt, altitude. SF being a sub-filter considered among the Kalman sub-filters $SF_1$, $SF_2$ (and optionally $SF_3$) associated with the INS/GNSS, INS/VEH and INS hybridizations solutions, respectively.

If a GNSS measurement is erroneous, same will corrupt the INS/VEH/GNSS main solution but not the INS/VEH solution associated with the sub-filter $SF_2$, nor the optional INS solution associated with the sub-filter $SF_3$. Similarly, if an erroneous measurement VEH is provided by the unit 18 for modeling the displacement of the vehicle VEH, same will corrupt the INS/VEH/GNSS main solution but not the INS/GNSS solution associated with the sub-filter $SF_1$, nor the optional INS solution associated with the sub-filter $SF_3$.

The integrity verification module 50 is then configured to detect an erroneous GNSS or VEH, by calculating the difference between the main position INS/VEH/GNSS and the position of each sub-solution associated with each Kalman sub-filter $SF_1$, $SF_2$ (and optionally $SF_3$), respectively. If the difference is too large, there is an erroneous [measurement]. If same is small, there is no erroneous [measurement].

In other words, such a difference between the different solutions INS/VEH/GNSS, INS/GNSS, INS/VEH, and optionally INS, associated with the main Kalman filter K and with the Kalman sub-filters $SF_1$, $SF_2$ (and optionally $SF_3$), respectively, is controlled by a deviation V such that:

$$Cor_{n+1}^{SF} = X_{n+1/n}^{SF} - X_{n+1/n} = V_{n+1}^{SF}$$

calculated at each Kalman cycle between the position states of the sub-filter $$X_{n+1/n}^{SF}$$

and of the main filter $X_{n+1/n}$.

The deviation is larger or smaller depending on the state studied, and inconsistent with the covariance of the deviation of the states, the position states X considered corresponding e.g. to the position states latitude, longitude, altitude, or any other possible state, in particular roll, pitch, heading, north speed, east speed, etc., which are very sensitive to errors, the test variable corresponding to the difference between the main Kalman filter K and the sub-filter considered among the Kalman sub-filters $SF_1$, $SF_2$ (and optionally $SF_3$) is then expressed in the following form:

$$V_{Lat} = X_{n+1/n}^{SF}(Lat) - X_{n+1/n}(Lat)$$

$$V_{Lon} = X_{n+1/n}^{SF}(Lon) - X_{n+1/n}(Lon)$$

$$V_{Alt} = X_{n+1/n}^{SF}(Alt) - X_{n+1/n}(Alt).$$

More precisely, the integrity verification module 50 is configured to check the deviation over time for each sub-filter $$E = V_X = X_{n+1/n}^{SF} - X_{n+1/n}$$

by comparing same, via a predetermined threshold, with the covariance of the deviation of the states.

Indeed, considering that the observation matrices of each sub-filter $H^{SF}$ and of measurement noise $R^{SF}$ are sub-matrices of the observation matrices H and measurement noise matrices R of the main Kalman filter K where the rows (columns respectively) related to the GNSS measurements have been set to zero (the rest being identical between the sub-filter and the main filter), and that the propagation F and model noise Q matrices are identical between the sub-filter and the main filter, then it is demonstrable by recurrence, by a person skilled in the art, that the expectancy $(X \cdot X^{SF^T})$ is equal to the difference of covariance matrix $P^{SF}-P$, which, by development, is equivalent to an expectancy of $((X-X^{SF})(X-X^{SF})^T)$ equal to P the covariance matrix of the main Kalman filter K.

According to an optional supplementary aspect, the integrity verification module 50 determines said threshold used to compare the deviation $$E = V_X = X_{n+1/n}^{SF} - X_{n+1/n}$$

with the covariance of the deviation of the states.

According to an example of the optional supplementary aspect, the device D, via the integrity verification module 50 thereof, is configured to compare:

at a predetermined latitude threshold, the deviation $V_{Lat}$ between the latitude position state $$X_{n+1/n}^{SF}(Lat)$$

of each Kalman sub-filter and the latitude position state $X_{n+1/n}$(Lat) of the main Kalman filter, at a predetermined threshold for longitude, the deviation $V_{Lon}$ between the longitude position state $$X_{n+1/n}^{SF}(Lon)$$

of each Kalman sub-filter and the longitude position state $X_{n+1/n}$(Lon) of the main Kalman filter, at a predetermined altitude threshold, the deviation $V_{Alt}$ between the altitude position state $$X_{n+1/n}^{SF}(Alt)$$

of each sub-filter and the altitude position state $X_{n+1/n}$ (alt) of the main Kalman filter, and to raise an alarm as soon as at least one deviation associated with one of the latitude, longitude, altitude components is greater than the corresponding predetermined threshold and associated with each of the latitude, longitude, altitude components, respectively.

As an optional supplement, the device is also configured to determine said predetermined threshold as a function of a predetermined probability of false alarm, considering e.g. a distribution of the test variable, corresponding to the deviation between the main Kalman filter K and the sub-filter considered, according to a Gaussian law centered at zero and with a standard deviation equal to one. For example, the detection threshold is chosen for the present example so that for 1% of the time an error is detected which is not present ($P_{fa}$=0.01)

Thereby, according to the previous example, the test variables $V_{Lat}$, $V_{Lon}$ and $V_{Alt}$ thus follow a Gaussian distribution centered at zero (when there is no erroneous [variable]) and with a respective standard deviation $\sqrt{P_\Delta(\text{Lat,Lat})}$, $\sqrt{P_\Delta(\text{Lon,Lon})}$ and $\sqrt{P_\Delta(\text{Alt,Alt})}$ with $P_\Delta$ the covariance matrix of the deviation $X^{SF}-X$ equal, as indicated hereinabove, to the deviation of the covariances $P^{SF}$ and P, as expressed according to the following equations:

$$P_\Delta \overset{def}{=} E\left[\left(X_{n+1/n}^{SF} - X_{n+1/n}\right)\cdot\left(X_{n+1/n}^{SF} - X_{n+1/n}\right)^T\right] = E\left[X_{n+1/n}^{SF} X_{n+1/n}^{SF\ T}\right] - E\left[X_{n+1/n} X_{n+1/n}^T\right] = P_{n+1/n}^{SF} - P_{n+1/n}$$

According to a probability of false alarm noted by $P_{fa}$, one seeks to establish a real threshold value such as:

$$V_X = X_{n+1/n}^{SF} - X_{n+1/n} = K_{fa}\cdot\sqrt{E\left(\left(X_{n+1/n} - X_{n+1/n}^{SF}\right)\left(X_{n+1/n} - X_{n+1/n}^{SF}\right)^T\right)} = K_{fa}\cdot\sqrt{\left(P_{n+1/n}^{SF} - P_{n+1/n}\right)} = K_{fa}\cdot\sqrt{(P_\Delta)},$$

with $K_{fa}$ the coefficient which makes it possible to have the desired predetermined probability of false alarm $p_{fa}$, e.g. by considering a Gaussian law centered at zero and with a standard deviation equal to one, for a probability of false alarm $p_{fa}$=0.01 then $K_{fa}$=1.96, whereas for $p_{fa}$=10-4 then $K_{fa}$=3.9.

The predetermined threshold for latitude is then $K_{fa}\cdot\sqrt{P_\Delta(\text{Lat,Lat})}$, similarly the predetermined threshold for longitude is then $K_{fa}\cdot\sqrt{P_\Delta(Lon,Lon)}$, and finally the predetermined threshold for altitude is then $K_{fa}\cdot\sqrt{P_\Delta(Alt,Alt)}$.

According to this particular optional embodiment, the raising of the alarm is then conditioned by the presence of at least one deviation V, associated with one of the latitude, longitude and altitude components, greater than the corresponding predetermined threshold and associated with each of the latitude, longitude and altitude components, respectively. In other words, three comparison tests are performed by the integrity verification module 50 according to latitude, longitude and altitude, respectively, and if:

$$|V_{Lat}| > K_{fa}\cdot\sqrt{P_\Delta(Lat, Lat)} \text{ or}$$

$$|V_{Lon}| > K_{fa}\cdot\sqrt{P_\Delta(Lon, Lon)} \text{ or}$$

$|V_{Alt}|>K_{fa}\cdot\sqrt{P_\Delta(Alt,Alt)}$ then an erroneous [measurement] is detected and the alarm is cancelled.

Herein, the alarm is raised by means of three distinct comparison tests, according to the latitude, the longitude and the altitude, respectively, the tests not being completely independent because of the correlation between the position states (latitude, longitude and altitude) according to an optional aspect. The probability of false alarm per test $p_{fa\text{-}test}$ is equal to the overall probability of false alarm $p_{FA}$ divided by three (i.e. $p_{fa\text{-}test}=p_{fa}/3$). According to a supplementary and optional aspect, the device D is also configured to determine a radius of protection with regard to a vulnerability of said data provided by said unit 18 for modeling displacement(s) of said vehicle, and/or vulnerability of said data provided by said receiver 16 of GNSS positioning measurements, said radius of protection ensuring that the value of the distance between the hybrid position provided from said main Kalman filter and the true position of said vehicle is smaller than the value of said radius of protection, said radius of protection being determined by determining an associated radius of protection associated with each of the first and second Kalman filters $SF_1$ and $SF_2$ respectively, by using, for each of the first and second Kalman filters:

- a coefficient associated with a predetermined probability of false alarm,
- the covariance matrix of the difference between the state of said Kalman sub-filter considered and the state of the main Kalman filter,
- a coefficient associated with a predetermined probability of non-detection
- the covariance matrix of each Kalman sub-filter, said radius of protection being the largest of the radii of protection associated with each of the first and second Kalman sub-filters.

In other words, in the absence of a deviation greater than said threshold predetermined previously by the integrity verification module 50, no alarm is raised, and the navigation and positioning device D then implements the determination of a radius of protection with respect to a vulnerability of said GNSS positioning measurements provided by said receiver 16 of GNSS positioning measurements or of measurements provided by said unit 18 for modeling displacement(s) of said vehicle.

To determine such a radius of protection, which is entirely predictive, from the covariances of the main Kalman filter K and the Kalman sub-filters $SF_1$ and $SF_2$, the navigation and positioning device D adds in a probability of non-detection $P_{nd}$.

In other words, according to such optional supplementary aspect, as targeted according to integrity mechanisms in aeronautics, the navigation and positioning device D according to the present invention seeks to determine what is the protection performance of the surveillance, i.e. until how far an erroneous input can lead the position error of the main Kalman filter K without detection.

The deviation between the INS/VEH/GNSS position 30 and the true position is suitable to be bounded as follows, taking the example of latitude:

$$|Lat^{INS/VEH/GNSS} - Lat^{True}| \le |Lat^{INS/VEH/GNSS} - Lat^{SF}| + |Lat^{SF} - Lat^{VraieTrue}|$$

$$|Lat^{INS/VEH/GNSS} - Lat^{True}| \le |X^{SF}(Lat) - X(Lat)| + |Lat^{SF} - Lat^{True}|$$

in the same way as before, the navigation and positioning device D according to the present invention then bounds $|Lat^{SF}-Lat^{True}|$ with the probability of non-detection $P_{nd}$ according to the following equation: $|Lat^{SF}-Lat^{True}|\le K_{pnd}\sqrt{P^{SF}(Lat,Lat)}$, with $K_{pnd}$ the coefficient serving to ensure that the probability of having a variable value v greater than the value $K_{pnd}$ is equal to $P_{nd}$, with v a variable that follows a centered Gaussian law of standard deviation 1. $K_{pnd}$ thus allowing to the rare and normal errors of the sub-filter which take the position outside the radius of protection with a probability $P_{nd}$ to be bounded In other words, in order to determine a radius of protection with respect to a vulnerability of said data provided by said unit for modeling displacement(s) of said vehicle, and/or a vulnerability of said data provided by said receiver of GNSS positioning measurements, the navigation and positioning device D according to the present invention bounds $|X^{SF}(Lat)-X(Lat)|$ when there is no detection, and obtains the radius of protection PL (Protection level) according to the following equation, for the latitude:

$$|Lat^{INS/VEH/GNSS} - Lat^{True}| \le K_{fa}\cdot\sqrt{P_\Delta(Lat, Lat)} + K_{pnd}\sqrt{P^{SF}(Lat, Lat)} \overset{def}{=} PL,$$

the radius of protection PL is predictable (i.e. without measurement) because same does not depend on the "obtained" but only on the statistics, and thus serves to make mission predictions for the vehicle.

According to another supplementary and optional aspect, in the absence of a deviation greater than said threshold previously predetermined by the integrity verification module 50, no alarm is raised, and the device is also configured to determine a radius of uncertainty, said radius of uncertainty being determined by determining a radius of uncertainty associated with each of the first and second Kalman sub-filters, using, for each of the first and second Kalman sub-filters:

- the difference between the state of said Kalman sub-filter considered and the state of the main Kalman filter,
- a coefficient associated with a predetermined probability of non-detection
- the covariance matrix of each Kalman sub-filter, said radius of uncertainty being the largest of the radii of uncertainty associated with each of the first and second Kalman sub-filters.

In a manner similar to what was previously indicated in relation to the determination of the radius of protection, according to the optional supplementary aspect, the navigation and positioning device D according to the present invention bounds the error with the radius of uncertainty UL (Uncertainty Level) according to the following equation, for the latitude:

$$|Lat^{INS/VEH/GNSS} - Lat^{True}| \leq |X^{SF}(Lat) - X(Lat)| + K_{pnd}\sqrt{P^{SF}(Lat, Lat)} \stackrel{def}{=} UL$$

Referring to aeronautical uses, radii of protection PL are calculated on the horizontal (HPL for horizontal protection level) and on the vertical (VPL for vertical protection level). For an aircraft, same are used in particular to know if it is possible to start a landing procedure e.g. (and where appropriate, avoid the mountains around the aircraft during landing). If the event of a detection of an erroneous [measurement], the aircraft then rather uses the horizontal radii of uncertainty HUL (Horizontal Uncertainty Level) and the vertical radii of uncertainty VUL (Vertical Uncertainty Level) in order to continue to bound the error.

The previous calculations of radius of protection PL and of uncertainty UL applied previously to the latitude, are this time applied to the altitude, in order to obtain the vertical radius of protection VPL and the vertical radius of uncertainty VUL, respectively.

To obtain the horizontal radius of protection HPL and the horizontal radius of uncertainty HUL, a two-dimensional space (2D) corresponding to the local horizontal plane is used so that:

$$\|Pos_H^{INS/VEH/GNSS} - Pos_H^{True}\| \leq \left\|Pos_H^{\frac{INS}{\frac{VEH}{GNSS}}} - Pos_H^{SF}\right\| + \|Pos_H^{SF} - Pos_H^{True}\| \text{ with}$$

with $Pos_H$, the position in the local horizontal plane, then $$\|Pos_H^{SF} - Pos_H^{True}\|$$

is bounded in the following way by the device D according to the present invention:

$$\|Pos_H^{SF} - Pos_H^{True}\| \leq K'_{pnd}\sqrt{\max vap(P_H^{SF})}$$

with $$P_H^{SF}$$

a 2×2 matrix corresponding to the projection of the $P^{SF}$ matrix on the horizontal position components, and maxvap( ) the operator that gives the largest eigenvalue of a 2×2 matrix:

$$\max vap(P_H^{SF}) = \frac{P_H^{SF}(1, 1) + P_H^{SF}(2, 2)}{2} + \sqrt{\left(\frac{P_H^{SF}(1, 1) - P_H^{SF}(2, 2)}{2}\right)^2 + P_H^{SF}(1, 2)^2}$$

$$K'_{pnd}$$

the coefficient such that the probability of having the value of a variable v, greater than $$K'^2_{pnd}$$

is equal to $P_{nd}$, with v a variable that follows a law of $\chi^2$ (usually pronounced as "khi-square" or "khi-two") of order 2.

It should be noted that in the particular case related to an aeronautical application, the latitude and the longitude are no longer considered independently, and that in such case the predetermined threshold used by the integrity verification module 50 to detect an error and raise an alarm corresponds to the deviation of position in the horizontal plane, in other words to the norm of the deviation in 2D, such that:

$$\|Pos_H^{INS/VEH/GNSS} - Pos_H^{SF}\| \leq K'_{fa} \cdot \sqrt{\max vap(P_H^{\Delta})}$$

with $$P_H^{\Delta}$$

the 2×2 matrix, which is the projection of the matrix $P_\Delta$, the with covariance matrix of the deviation $X^{SF}-X$ on the horizontal position components, and with $$K'_{fa}$$

the coefficient such that the probability of having the value of a variable v, greater than $$K'^2_{fa}$$

is equal to $P_{fa}$, with v a variable which follows a law of $\chi^2$ (usually pronounced as "khi-square" or "khi-two") of order 2, so that:

$$HUL = \|Pos_H^{INS/VEH/GNSS} - Pos_H^{SF}\| + K'_{pnd}\sqrt{\max vap(P_H^{SF})}$$

$$HPL = K'_{fa} \cdot \sqrt{\max vap(P_H^{\Delta})} + K'_{pnd}\sqrt{\max vap(P_H^{SF})}$$

the final radius of protection (of uncertainty, respectively) being the largest of the radii of protection (of uncertainty, respectively) associated with the sub-filters $SF_1$ and $SF_2$.

It should be noted that the third Kalman sub-filter $SF_3$ configured to calculate INS corrections 44 of navigation data from the data provided only by the inertial measurement unit does not correspond to a failure hypothesis but is solely intended to serve for an optional reconfiguration as described thereafter; the third sub-filter $SF_3$ is thus not taken into account for the determination of the aforementioned radius of protection and of uncertainty where only the first and second sub-filters $SF_1$ and $SF_2$ associated with the INS/GNSS and INS/VEH solutions, respectively, are involved.

Figure 4:
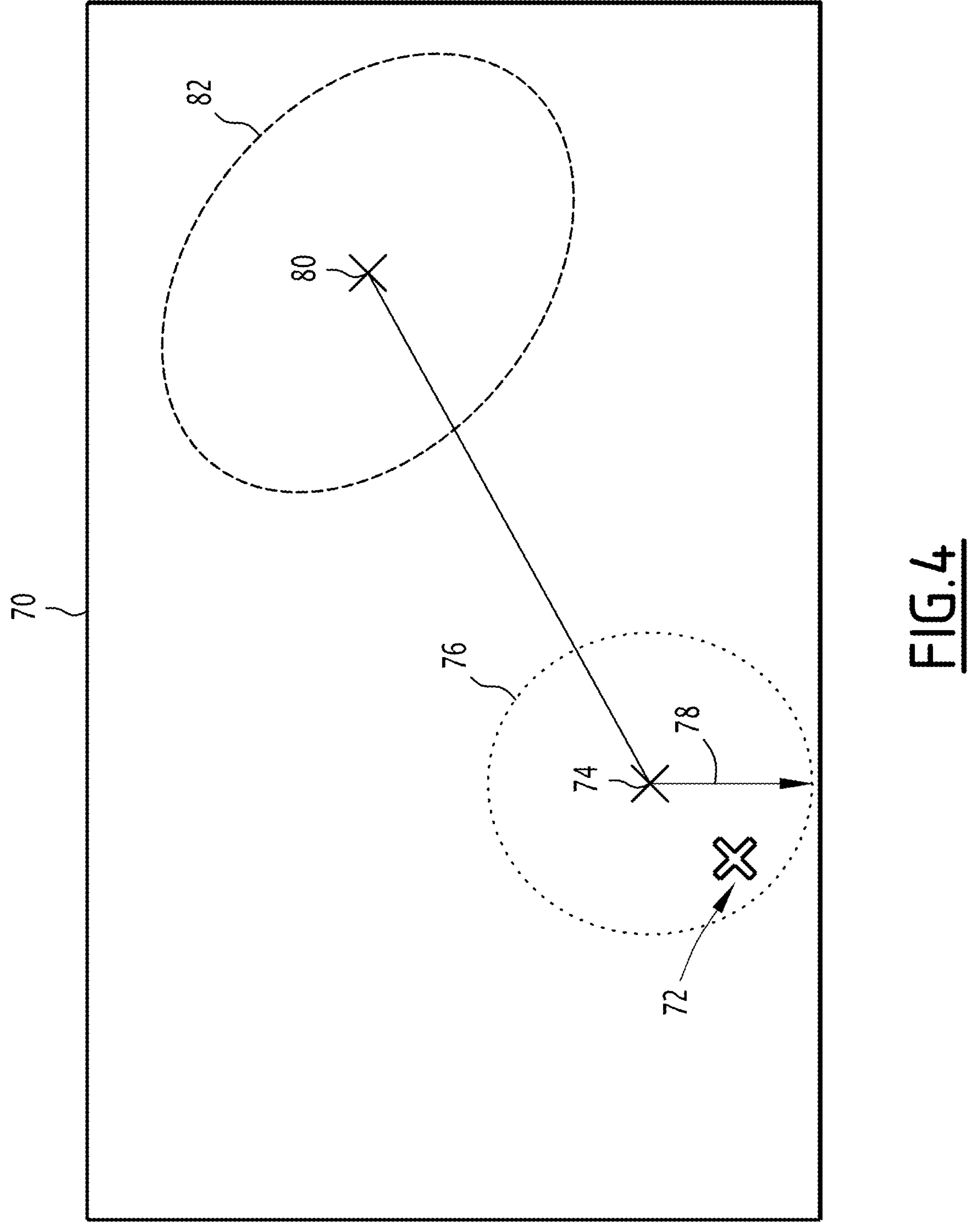
FIG. 4 illustrates, by means of a representation of the radius of protection, a situation where the main Kalman filter is corrupted

Thereby, in the view 70 of the example of FIG. 4 of a situation where the main Kalman filter is corrupted, the true position 72 of a vehicle, wherein the device D according to the present invention is on-board, is shown.

The INS/VEH position 74 obtained via the sub-filter $SF_2$ of FIG. 2 is healthy and represented in a circle 76 of radius 78 the value of value is equal to $$K'_{pnd}\sqrt{\max vap(P_H^{SF})}.$$

The position 80 of the main Kalman filter K associated with INS/VEH/GNSS hybrid solution is corrupted due to an erroneous GNSS. More precisely, the 2D projection 82 of the covariance matrix of the main Kalman K filter no longer represents the error of the INS/VEH/GNSS position. However, as the sub-filter $SF_2$ associated with the INS/VEH solution does not use the GNSS measurement, the INS/VEH position 74 is healthy. That is to say that the position error follows a Gaussian law centered in 0 and with a covariance matrix $P^{SF}$.

According to another optional aspect, in the event of the raising of an alarm, the main Kalman filter K, the first Kalman sub-filter $SF_1$ and the second Kalman sub-filter $SF_2$ are also apt to be reconfigured on the third Kalman sub-filter $SF_3$ configured to calculate navigation data corrections from the data provided only by the inertial measurement unit.

In other words, the third Kalman sub-filter $SF_3$ configured to calculate navigation data corrections from the data provided solely by the inertial measurement unit, is useful for reconfiguring the other positioning solutions in the event of a raise of alarm associated with the detection of an erroneous [measurement] due to a loss of integrity of said data provided by said unit 18 for modeling displacement(s) of said vehicle, and/or of said data provided by said receiver 16 of GNSS positioning measurements.

More precisely, the main Kalman filter K, the first Kalman sub-filter $SF_1$ and the second Kalman sub-filter $SF_2$ are each reconfigured by replacing (i.e. overwriting) their own state and their own covariance matrix with the state and covariance matrix of the third Kalman sub-filter $SF_3$, respectively. It should be noted that when the accuracy of the inertial measurement unit is less than a predetermined accuracy threshold, the vehicle user is able in addition to carry out a manual readjustment of the position, as they are able to know where they are and whether, indeed, GNSS or VEH can no longer be trusted In other words, at the time of the reconfiguration, where appropriate, after the manual position readjustment on the Kalman sub-filter $SF_3$ associated with the INS solution, the reconfiguration is thus carried out as follows:

$$X_{n+1/n} = X_{n+1/n}^{SF-INS} \text{ and } P_{n+1/n} = P_{n+1/n}^{SF-INS}$$

for the main Kalman K filter, $$X_{n+1/n}^{SF} = X_{n+1/n}^{SF-INS} \text{ and } P_{n+1/n}^{SF} = P_{n+1/n}^{SF-INS}$$

for all sub-filters $SF_1$ and $SF_2$, with $$X_{n+1/n}^{SF-INS} \text{ and } P_{n+1/n}^{SF-INS}$$

the state and covariance matrix of the Kalman sub-filter $SF_3$ associated with the INS solution.

It is not obvious to know which measurement is erroneous among VEH and GNSS, because the integrity verification module 50 is suitable for determining that the main Kalman filter K is corrupted but not for determining which of the sub-filters $SF_1$ and $SF_2$ is not corrupted. Indeed, even if only one of the sub-filters $SF_1$ and $SF_2$ has a test that exceeds the associated predetermined threshold, it may be the other sub-filter that is corrupted.

On the other hand, the third Kalman sub-filter $SF_3$ associated with the INS solution cannot be corrupted by a VEH or GNSS failure. Same is thus healthy.

It should be noted that even if the VEH or GNSS measurements are corrupted over a short period of time, the corruption of the sub-filters $SF_1$ or $SF_2$ can last a long time and impact all the states thereof during said period.

Moreover, the reconfiguration implemented automatically by the device D according to the present invention makes it possible to avoid completely restarting the inertial measurement unit or the main Kalman filter and the Kalman sub-filters $SF_1$, $SF_2$ and $SF_3$ and to realign the inertial measurement unit 12. According to an optional aspect not shown, the device further comprises a module for initializing the position of said vehicle configured to initialize the position of said vehicle by using at least one of the elements belonging to the group comprising at least:

- a positioning measurement provided by a GNSS source,
- a consolidated positioning measurement from a plurality of distinct GNSS sources, e.g. (Galileo versus GPS or single-frequency L1 versus single-frequency L5, etc.) to become protected against e.g. multi-paths and simple GNSS interferers,
- a position entered manually via an input interface of said device,
- a stored position prior to the preceding switch-off of said device,
- a positioning measurement provided by a GNSS source consolidated by a position stored prior to the preceding switching off of said device,
- a position entered manually via an input interface of said device, consolidated by a position stored prior to the previous switching off of said device.

Indeed, the unit 18 for modeling displacement(s) of said vehicle does not provide information on the absolute position in latitude, longitude and altitude but only displacement information, and the Kalman sub-filters $SF_2$ and $SF_3$ without any source of absolute position, associated with INS/VEH and INS solutions, respectively, have thus to be initialized with a position using at least one of the elements belonging to the abovementioned group.

According to a particular aspect, the device D according to the present invention, when same implements the consolidation of an initial GNSS position or a manual input by means of a position memorized prior to the previous switching off of said device D, in particular in the event of immobilization of the vehicle wherein said is taken on-board (i.e. said switch-off corresponds to a powering down of said device D in particular in the event of stop and powering down of said vehicle), makes it possible, if there is a difference while the vehicle has not moved, to inform the user, via the transmission, by said device D of a predetermined signal, of the inconsistency, the user then being able to decide whether the initial position is correct or not.

A person skilled in the art would understand that the invention is not limited to the embodiments described, nor to the particular examples of the description, the abovementioned embodiments and variants being suitable for being combined with one another so as to generate new embodiments of the invention.

The present invention thereby proposes a particular architecture of the navigation and positioning device making it possible to detect the vulnerabilities of the aforementioned GNSS and/or VEH measurements, in order to maintain almost permanently, or even permanently, the integrity of the associated location.

Such a check is not only carried out only on one satellite at a time, which prevents limiting the application domain.

In addition, the navigation and positioning device D is, according to an optional aspect, suitable for permanently proposing a set of navigation solutions, a part of which has not used GNSS and/or VEH measurements for a certain time, typically from several hours to several days.

Furthermore, according to an optional variant of embodiment, the navigation and positioning device D is also suitable for providing a radius of protection against a vulnerability of the GNSS and/or VEH measurements and apt to initiate a reconfiguration of the main Kalman filter K on a solution of a healthy Kalman sub-filter if a vulnerability of the GNSS and/or VEH measurements is detected. Thereby, a healthy fallback solution is always available if a problem is detected on the GNSS and/or VEH signals.

Thereby, to summarize, the present invention makes it possible to maintain the integrity of the location, to warn when the GNSS and/or VEH signals are not reliable, to reconfigure on a solution not tainted by the vulnerability of the GNSS and/or VEH measurements, in other words, to reconfigure the main Kalman filter K on a "healthy" Kalman sub-filter, and to have available a panel of navigation solutions deduced from Kalman sub-filters that have navigated without the GNSS and/or without the VEH measurement since a variable time.

The invention claimed is:

1. An improved navigation and positioning device carried on-board a vehicle moving between two geographical positions, the device comprising:

- an inertial measurement unit providing navigation measurements;
- a receiver of GNSS positioning measurements;
- a modeler modeling displacement(s) of the vehicle;
- a closed-loop main Kalman filter calculating navigation data corrections by hybridization of data provided, at the input of the main Kalman filter, at the same time, by said inertial measurement unit, said receiver and said modeler; and
- at the outlet of said main Kalman filter, at least two distinct Kalman sub-filters comprising:
  - a first Kalman sub-filter calculating navigation data corrections by hybridization of data provided by said inertial measurement unit and by said receiver, without data provided by said modeler; and
  - a second Kalman sub-filter calculating navigation data corrections by hybridization of data provided by said inertial measurement unit and by said modeler, without data provided by said receiver, each Kalman sub-filter applying the hybrid correction provided, at the input, at each cycle, by said main Kalman filter during the propagation phase thereof, and determining a positioning of the vehicle associated with the Kalman sub-filter considered by applying the correction calculated by the Kalman sub-filter to the hybrid positioning obtained from said main Kalman filter.

2. The device according to claim 1, further comprising an integrity verifier checking, at each cycle, integrity of data provided by said modeler, and/or the integrity of data provided by said receiver, by comparing, with a predetermined threshold, the difference between the state of each Kalman sub-filter and the state of said main Kalman filter, and in the event of a deviation greater than the predetermined threshold, raising an alarm signaling a vulnerability of the data provided by said modeler, and/or a vulnerability of the data provided by.

3. The device according to claim 2, wherein the device compares, (i) with a predetermined threshold for latitude, a deviation between a latitude position state of each Kalman sub-filter and a latitude position state of said main Kalman filter, (ii) with a predetermined threshold for longitude, a deviation between a longitude position state of each Kalman sub-filter and a longitude position state of said main Kalman filter, (iii) with a predetermined threshold for altitude, a deviation between an altitude position state of each Kalman sub-filter and an altitude position state of said main Kalman filter, and (iv) to raise an alarm as soon as at least one deviation associated with one of the latitude, longitude, altitude components is greater than the corresponding predetermined threshold associated with each of the latitude, longitude, altitude components, respectively.

4. The device according to claim 2, wherein the device determines the predetermined threshold based on a predetermined probability of false alarm.

5. The device according to claim 2, further comprising, at the output of said main Kalman filter, a third Kalman sub-filter calculating navigation data corrections from the data provided solely by said inertial measurement unit, and in the event of the raising of an alarm, said main Kalman filter, said first Kalman sub-filter and said second Kalman sub-filter are reconfigured on the third Kalman sub-filter.

6. The device according to claim 5, wherein said main Kalman filter, said first Kalman sub-filter and said second Kalman sub-filter are each reconfigured by replacing their own state and their own covariance matrix with the state and the covariance matrix of said third Kalman sub-filter, respectively.

7. The device according to claim 1, wherein the device determines a radius of protection with respect to a vulnerability of data provided by said modeler, and/or a vulnerability of data provided by said receiver, the radius of protection guaranteeing that the value of a distance between the hybrid position provided from said main Kalman filter and the true position of the vehicle is less than the value of the radius of protection, the radius of protection being determined by determining a radius of protection associated with each of said first and second Kalman sub-filters, using, for each of said first and second Kalman sub-filters:

a coefficient associated with a predetermined probability of false alarm, the covariance matrix of the difference between the state of the Kalman sub-filter considered and the state of said main Kalman filter, a coefficient associated with a predetermined probability of non-detection, and the covariance matrix of each Kalman sub-filter, the radius of protection being the largest of the radii of protection associated with each of said first and second Kalman sub-filters.

8. The device according to claim 1, wherein the device determines a radius of uncertainty, the radius of uncertainty being determined by determining a radius of uncertainty associated with each of said first and second Kalman sub-filters, using, for each of said first and second Kalman sub-filters:

a difference between a state of said Kalman sub-filter considered and a state of said main Kalman filter, a coefficient associated with a predetermined probability of non-detection, and the covariance matrix of each Kalman sub-filter, the radius of uncertainty being the largest of the radii of uncertainty associated with each of said first and second Kalman sub-filters.

9. The device according to claim 1, further comprising an initiator initializing a position of the vehicle using at least one of elements belonging to the group consisting of:

a positioning measurement provided by a GNSS source, a consolidated positioning measurement from a plurality of distinct GNSS sources, a position entered manually via an input interface of the device, a stored position prior to the preceding switch-off of the device, a positioning measurement provided by a GNSS source consolidated by a position stored prior to the preceding switching off of the device, and a position entered manually via an input interface of the device consolidated by a position stored prior to the preceding switching off of the device.

10. A vehicle comprising a navigation and positioning device according to claim 1.

* * * * *